Oct. 12, 1965   J. E. RAMSEY, JR   3,212,005
PHASE ADJUSTING MEANS FOR INDUCTION METER INCLUDING VOLTAGE
FLUX SHUNT PATH HAVING A SHORTED TURN THEREON
Filed June 21, 1961
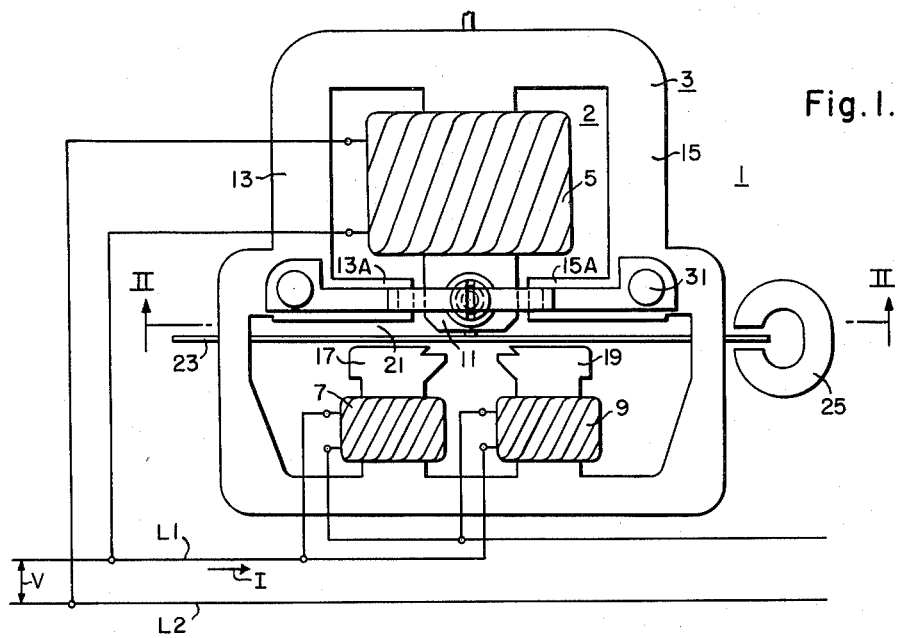
Fig. 1.
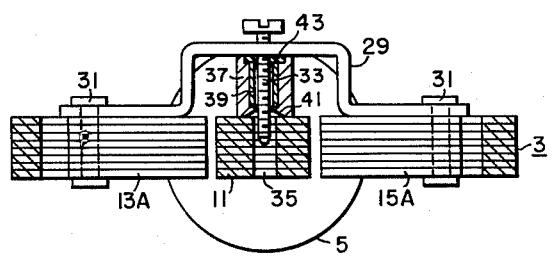
Fig. 2.
Fig. 4.
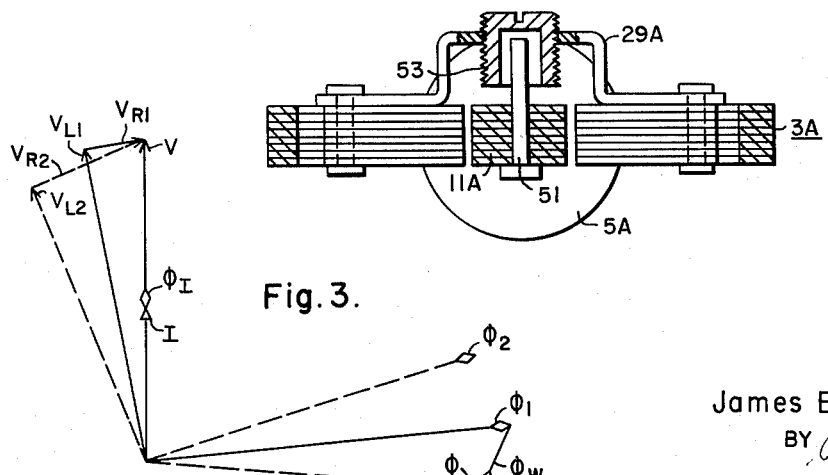
Fig. 3.
INVENTOR
James E. Ramsey, Jr.
BY *C. L. Freedman*
ATTORNEY United States Patent Office 3,212,005
Patented Oct. 12, 1965

3,212,005
PHASE ADJUSTING MEANS FOR INDUCTION METER INCLUDING VOLTAGE FLUX SHUNT PATH HAVING A SHORTED TURN THEREON
James E. Ramsey, Jr., Raleigh, N.C., assignor to Westinghouse Electric Corporation, East Pittsburgh, Pa., a corporation of Pennsylvania
Filed June 21, 1961, Ser. No. 118,601
11 Claims. (Cl. 324—138)

This invention relates to induction measuring devices and it has particular relation to induction measuring devices which are responsive to a function of the product of two variable quantities.

In certain electrical devices, it is desirable to control the phase relationship between two variable alternating quantities. This is particularly true of induction devices which are responsive to a function of volt amperes. Such induction devices may be employed for indicating or integrating values of vars, watts or volt amperes which are dependent on the product of voltage and current present in an alternating electrical circuit. The invention is particularly suitable for induction-type watthour meters and will be described with reference to such meters. In a conventional induction-type watthour meter a voltage magnetic flux derived from a voltage winding and a current magnetic flux derived from current windings produce a shifting magnetic field for driving an electroconductive armature. The response of the armature is dependent on the phase relationship of these magnetic fluxes.

In accordance with the invention the phase relationship between the voltage and current magnetic fluxes of a watthour meter is controlled by directing magnetic flux derived from the voltage winding through a tubular electroconductive element. The electroconductive element in effect constitutes a closed secondary winding of a transformer wherein the voltage winding is the primary winding. The loading of the voltage winding by the electroconductive element is reversably adjustable by the operation of screw-threaded means which may be operated to alter the coupling between the electroconductive element and the voltage winding. The adjustment of the loading serves to adjust the phase relationship between the aforesaid voltage and current magnetic fluxes. By suitably selecting the temperature response of the magnetic path supplying magnetic flux to the electroconductive element, temperature compensation can be provided for the induction device.

It is therefore an object of the invention to provide an induction device responsive to the phase relationship between two alternating variable quantities with improved means for controlling such phase relationship.

It is also an object of the invention to provide an induction type device responsive to a function of voltage amperes with mechanism for controlling smoothly and reversably the response of the device to the phase relationship between voltage and current quantities employed to energize the device.

Other objects of the invention will be apparent from the following description taken in conjunction with the accompanying drawing in which:

FIGURE 1 is a schematic view with parts shown in elevation of a watthour meter embodying the invention;

FIG. 2 is a sectional view taken along the line II—II of FIG. 1;

FIG. 3 is a vector diagram showing relationship of current voltages and magnetic flux components in the embodiment of FIG. 1, and FIG. 4 is a sectional view similar to the view of FIG. 2 but showing a modified form of the invention.

Referring to the drawing, FIG. 1 shows a watthour meter 1 for measuring energy supplied over an alternating current circuit represented by conductors L1 and L2. Although this circuit may be a three-wire single-phase circuit or a polyphase circuit, it will be assumed that it is a two-wire alternating-current circuit operating at a frequency of sixty cycles per second. The watthour meter 1 includes an electromagnet 2 which comprises a magnetic structure 3, a voltage winding or coil 5 and current windings 7 and 9. The magnetic structure is constructed of laminations of soft magnetic material such as silicon iron. It includes an E-shaped voltage section having a voltage pole 11 and two outer legs 13 and 15. The voltage coil 5 surrounds the voltage pole 11.

The magnetic structure also includes a current section having two current poles 17 and 19 which are spaced from the voltage pole 11 to define an air gap 21. The current windings 7 and 9 respectively surround the voltage poles 17 and 19 and are so energized that when magnetic flux is directed upwardly in the current pole 17 as viewed in FIG. 1, magnetic flux is directed downwardly in the current pole 19. It will be understood that the voltage coil 5 may be constructed of a large number of turns of copper conductor of small diameter whereas the current windings 7 and 9 may be constructed of a relatively small number of turns of large diameter copper conductor. The magnetic structure is of planar construction, the voltage and current poles all being in a common plane with the remainder of the magnetic structure.

An electroconductive armature in the form of a disc 23 has a portion positioned in the air gap 21 and is mounted for rotation about the axis of the disc. A portion of the disc also is located in the air gap of a permanent magnet 25 for damping purposes. The construction of the watthour meter as thus far specifically set forth is well known in the art.

When the voltage coil 5 and current windings 7 and 9 are properly energized from the conductors L1 and L2 a shifting magnetic field is produced in the air gap 21 which develops a torque acting between the disc 23 and the electromagnet for the purpose of producing rotation of the disc about its axis. The rotation of the disc 23 is dependent on the product of the voltage between the conductors L1 and L2, the current flowing through the conductors and the phase displacement between such current and voltage. Rotation of the disc 23 may be employed in any suitable manner for indicating energy supplied over the conductors L1 and L2 as by operating a conventional register (not shown).

In order to establish proper phase relationships in the meter it is the practice to provide a high inductance for the voltage coil 5. To this end, the legs 13 and 15 are provided with extensions, respectively 13A and 15A, which extend toward the free end of the voltage pole 11. Because of the substantial magnetic permeability offered to flux flowing in the voltage section of the magnetic structure, the current flowing in the coil 5 lags the voltage applied to the coil by an angle which is slightly less than 90°. For proper operation the magnetic flux supplied to the air gap 21 by the voltage coil 5 should be in quadrature with the current magnetic flux supplied to the air gap by the current windings 7 and 9 when the circuit represented by the conductors L1 and L2 is operating at unity power factor. The additional lagging of the watthour meter required to establish the desired phase relationship now will be described.

As shown in FIGS. 1 and 2, an auxiliary magnetic path is provided which includes a bracket 29 constructed of a soft magnetic material such as cold-rolled steel. This bracket has its ends secured respectively to the outer legs 13 and 15 in any suitable manner as by rivets 31. It will be noted that this bracket extends across the voltage pole 11 at a position adjacent the air gaps between the extensions 13A and 15A and the voltage pole 11.

At a central point, the bracket has a threaded opening for receiving a machine screw 33 constructed of a soft magnetic material such as soft magnetic steel. The tip of this screw may extend into an opening 35 provided in the voltage pole 11.

The bracket 29 and the screw 33 establish a path for magnetic flux derived from the voltage coil 5 which extends from the voltage pole 11 to the screw 33. From the screw 33 the path continues through two parallel branches formed by two halves of the bracket 29 to the outer legs 13 and 15. The amount of magnetic flux passing through this magnetic path may be adjusted by rotating the screw 33 to alter its axial position relative to the voltage pole 11.

The magnetic path formed by the screw 33 and the bracket 29 is employed for adjustably loading the voltage coil 5. To this end, an electroconductive member is positioned to be linked by magnetic flux passing through the magnetic path. In the embodiment of FIG. 2, the electroconductive member takes the form of a tube 37 which may be constructed of copper and which is concentric with the screw 33.

In effect, the tube 37 constitutes a closed secondary winding for a transformer in which the primary winding is represented by the voltage coil 5. Losses due to current flowing in the tube 37 are reflected back to the voltage coil 5. The loading is adjusted by manipulation of the screw 33 and is employed for adjusting the angle by which magnetic flux derived from the voltage coil 5 lags the voltage applied to the coil. By this expedient the voltage magnetic flux applied by the voltage coil 5 to the air gap 21 may be brought into quadrature with the current magnetic flux supplied by the current windings 7 and 9 to the air gap when the watthour meter is operating to measure a unity-power-factor load.

The construction thus far described lends itself admirably to the provision of Class II temperature compensation for the watthour meter. Such compensation is provided by constructing a part of the magnetic path of a material having a substantial negative temperature coefficient of permeability. Such material is well known in the art and may take the form of an austenitic iron-nickle alloy having approximately 30% nickle. Such an alloy has a substantial negative temperature coefficient of permeability over the range of temperatures to which watthour meters are normally subjected in operation. In a preferred embodiment of the invention, a sleeve 39 of this material is provided which is concentric with the screw 33 and the tube 37 and which is shown intermediate the screw and the tube.

An increase in temperature of the watthour meter tends to increase the losses of the voltage coil due to the resultant increase in resistance of the copper windings of the coil. However, the action of the sleeve 39 reduces the loading of the voltage coil by the tube 37 and can be proportioned to compensate for the effect of temperature on the phase relationship between the current and voltage magnetic fluxes.

In a preferred embodiment of the invention the tube 37 and the sleeve 39 are constructed as a sub-assembly. To this end, an inwardly directed lip 41 is provided at the lower end of the tube 37 to constitute a stop for the sleeve 39. At its upper end the tube 37 in FIG. 2 is provided with an enlarged bore for receiving a washer 43. This washer is firmly secured to the tube in any suitable manner as by making it a press fit in the bore of the tube. The washer has two functions to perform. It serves as a stop for the sleeve 39 and it also grasps the screw 33 firmly to prevent alteration of the position of the screw under the influence of vibration or shock. Various resilient plastic materials may be employed for this purpose. For example, the washer may be constructed of nylon.

With the screw 33 in its highest position as viewed in FIG. 2, the voltage magnetic flux should be lagged slightly more than 90° behind the voltage applied to the voltage coil (i.e. overlagged). The screw 33 then may be moved down as viewed in FIG. 2 to provide the exact quadrature relationship desired.

The desired overlagging may be provided by a conventional fixed lagging loop. However, the voltage magnetic flux desirably may be lagged sufficiently by connecting the current windings 7 and 9 in parallel as shown in FIG. 1. This connects the current windings in a closed local circuit which lags the voltage magnetic flux.

The theory of the invention will be discussed with reference to the vector diagram presented in FIG. 3. When the circuit represented by the conductors L1 and L2 is supplying a unity power factor load the current I supplied to the current windings 7 and 9 in parallel is in phase with the voltage V supplied to the voltage coil 5. The current I produces a current magnetic flux $\phi_I$ in phase with the current.

If the screw 33 is screwed out (upwardly in FIG. 2) for minimum coupling, a loss component $V_{R1}$ is reflected back to the voltage coil 5 by the tube 37 and adds vectorally to the inductive voltage component $V_{L1}$ to equal the applied voltage V. At the same time, if the lagging effect of the current windings is ignored, a voltage magnetic flux $\phi_1$, is provided which lags the current I by slightly less than 90°.

Due to the lagging effect of the parallel-connected current windings 7 and 9 a voltage magnetic flux component $\phi_W$ is introduced which produces a resultant voltage magnetic flux $\phi$ in the airgaps lagging the current I by slightly more than 90°.

If the screw 33 is screwed in (downwardly as viewed in FIG. 2) a larger loss component $V_{R2}$ is reflected back to the voltage coil 5 and the vectors $V_{L1}$ and $\phi_1$ swing in a counterclockwise direction to the positions $V_{L2}$ and $\phi_2$ respectively as shown in dotted lines in FIG. 2.

Adjustment of the screw 33 thus alters the phase of the resultant voltage magnetic flux relative to the current over a suitable range. By proper adjustment of the screw 33 the resultant voltage magnetic flux $\phi$ may be made to lag the current I by precisely 90° for a unity powerfactor load.

If desired, a fixed magnetic path may be employed and the adjustment may be effected by manipulation of the electroconductive member. Such an embodiment is illustrated in FIG. 4 wherein an electromagnet 3A and a bracket 29A correspond respectively to the electromagnet 3 and a bracket 29 of FIGS. 1 and 2. The electromagnet 3A is similar in construction to the electromagnet 3 but has a headed soft magnetic pin 51 secured to its voltage pole 11A. This pin coacts with the bracket 29A to establish a fixed magnetic path for flux derived from the voltage coil 5A which corresponds to the voltage coil 5 of FIGS. 1 and 2.

The bracket 29A is similar in construction to the bracket 29 of FIGS. 1 and 2 except that it has a larger threaded opening for receiving in threaded engagement therewith a threaded electroconductive tube 53 which may be constructed of copper. This tube is concentric with the pin 51 and provides an adjustable loading for the voltage coil 5A in the same manner discussed for the tube 37 of FIGS. 1 and 2. By rotation of the tube 53 it is moved axially for the purpose of varying the effective amount of the tube which is linked by magnetic flux flowing through the pin 51. Consequently, rotation of the tube 53 serves to adjust the loading of the voltage coil 5A and the lagging of voltage magnetic flux. A Class II temperature compensation may be provided for the watt-hour meter of FIG. 4 by surrounding the pin 51 by a sleeve similar to the sleeve 39 of FIG. 2. However, to simplify the presentation of FIG. 4, it will be assumed that such a sleeve is not provided.

Although the invention has been described with reference to certain specific embodiments thereof, numerous modifications falling within the spirit and scope of the invention are possible.

I claim as my invention:

1. In an induction device responsive to a function of the volt-amperes in an alternating current circuit, an electromagnet unit comprising an E-shaped planar soft magnetic voltage section having a central voltage pole and two outer legs, a soft magnetic current section having current poles spaced from the voltage pole to define an air gap therebetween, voltage winding means effective when energized in accordance with an alternating voltage for directing first alternating magnetic flux through the voltage pole into the air gap, current winding means effective when energized at least in part by alternating current for directing second alternating magnetic flux through the current poles into the air gap to establish with the first magnetic flux a shifting resultant magnetic field in the air gap, an electroconductive armature device mounted for rotation relative to the electromagnet unit about an axis, said armature having a portion positioned in the air gap to develop a torque from said resultant magnetic field which acts to rotate the armature device relative to electromagnet unit about said axis, said electromagnet unit having soft magnetic extensions between the free ends of the voltage pole and the outer legs to provide a high inductance for the voltage winding means, said electromagnet unit establishing a loop for the first alternating magnetic flux which includes a first magnetic loop part comprising the voltage pole, second magnetic loop parts comprising the outer legs in parallel and third non-magnetic loop parts extending in parallel between the free end of the voltage pole and the free ends of the outer legs through a portion of the armature device, a magnetic path unit including a soft magnetic member extending transversely relative to the plane of the voltage section from said voltage pole adjacent the air gap, and magnetic means completing with the magnetic member a magnetic path which excludes the air gap for magnetic flux produced by the voltage winding means, and a closed electroconductive unit linked substantially only with magnetic flux carried by the magnetic path, at least one of said units being adjustable to vary the loading of the voltage winding means by the electroconductive unit, said magnetic means extending symmetrically from a position adjacent the magnetic member to the free ends of the outer legs to define with the magnetic member said magnetic path which is clear of the armature device, said magnetic means directing magnetic flux between the voltage pole and each of the outer legs through the magnetic member.

2. In an induction device responsive to a function of the volt-amperes in an alternating current circuit, an electromagnet unit comprising an E-shaped planar magnetic voltage section having a central voltage pole and two outer legs, a soft magnetic current section having current poles spaced from the voltage pole to define an air gap therebetween, voltage winding means effective when energized in accordance with an alternating voltage for directing first alternating magnetic flux through the voltage pole into the air gap, current winding means effective when energized at least in part by alternating current for directing second alternating magnetic flux through the current poles into the air gap to establish with the first magnetic flux a shifting resultant magnetic field in the air gap, an electroconductive armature device mounted for rotation relative to the electromagnet unit about an axis, said armature having a portion positioned in the air gap to develop a torque from said resultant magnetic field which acts to rotate the armature device relative to electromagnet unit about said axis, said electromagnet unit having soft magnetic extensions between the free ends of the voltage pole and the outer legs to provide a high inductance for the voltage winding means, said electromagnet unit establishing a loop for the first alternating magnetic flux which includes a first magnetic loop part comprising the voltage pole, second magnetic loop parts comprising the outer legs in parallel and third non-magnetic loop parts extending in parallel between the free end of the voltage pole and the free ends of the outer legs through a portion of the armature device, a magnetic path unit including a soft magnetic member extending transversely relative to the plane of the voltage section from said voltage pole adjacent the air gap, magnetic means completing with the magnetic member a separate magnetic path in shunt with the air gap for magnetic flux produced by the voltage winding means, and a closed electroconductive unit linked substantially only with magnetic flux carried by the magnetic path, and a magnetic element having a negative temperature coefficient of permeability which is substantially larger than that of the magnetic path, said magnetic element being in parallel with at least a part of the magnetic path to control magnetic flux linking the closed electroconductive unit, said magnetic means extending symmetrically from a position adjacent the magnetic member to the free ends of the outer legs to define with the magnetic member said magnetic path which is clear of the armature device, said magnetic means directing magnetic flux between the voltage pole and each of the outer legs through the magnetic member.

3. In an induction device responsive to a function of the volt-amperes in an alternating current circuit, an electromagnet unit comprising an E-shaped planar soft magnetic voltage section having a central voltage pole and two outer legs, a soft magnetic current section having current poles spaced from the voltage pole to define an air gap therebetween, voltage winding means effective when energized in accordance with an alternating voltage for directing first alternating magnetic flux through the voltage pole into the air gap, current winding means effective when energized at least in part by alternating current for directing second alternating magnetic flux through the current poles into the aid gap to establish with the first magnetic flux a shifting resultant magnetic field in the air gap, an electroconductive armature device mounted for rotation relative to the electromagnet unit about an axis, said armature having a portion positioned in the air gap to develop a torque from said resultant magnetic field which acts to rotate the armature device relative to electromagnet unit about said axis, said electromagnet unit having soft magnetic extensions between the free ends of the voltage pole and the outer legs to provide a high inductance for the voltage winding means, said electromagnet unit establishing a loop for the first alternating magnetic flux which includes a first magnetic loop part comprising the voltage pole, second magnetic loop parts comprising the outer legs in parallel and third non-magnetic loop parts extending in parallel between the free end of the voltage pole and the free ends of the outer legs through a portion of the armature device, a magnetic path unit including a soft magnetic member extending transversely relative to the plane of the voltage section from said voltage pole adjacent the air gap, and magnetic means completing with the magnetic member a separate magnetic path in shunt with the air gap for magnetic flux produced by the voltage winding means, and a closed electroconductive unit linked with the magnetic path, said magnetic path and said closed electroconductive unit having screw-threaded parts operable for adjusting the loading of the voltage winding means by the closed electroconductive unit, said magnetic means extending symmetrically from a position adjacent the magnetic member to the free ends of the outer legs to define with the magnetic member said magnetic path which is clear of the armature device, said magnetic means directing magnetic flux between the voltage pole and each of the outer legs through the magnetic member.

4. In an induction device responsive to a function of the volt-amperes in an alternating current circuit, an electromagnet unit comprising an E-shaped planar soft magnetic voltage section having a central voltage pole and two outer legs, a soft magnetic current section having current poles spaced from the voltage pole to define an air gap therebetween, voltage winding means effective when energized in accordance with an alternating voltage for directing first alternating magnetic flux through the voltage pole into the air gap, current winding means effective when energized at least in part by alternating current for directing second alternating magnetic flux through the current poles into the air gap to establish with the first magnetic flux a shifting resultant magnetic field in the air gap, an electroconductive armature device mounted for rotation relative to the electromagnet unit about an axis, said armature having a portion positioned in the air gap to develop a torque from said resultant magnetic field which acts to rotate the armature device relative to electromagnet unit about said axis, said electromagnet unit having soft magnetic extensions between the free ends of the voltage pole and the outer legs to provide a high inductance for the voltage winding means, said electromagnet unit establishing a loop for the first alternating magnetic flux which includes a first magnetic loop part comprising the voltage pole, second magnetic loop parts comprising the outer legs in parallel and third non-magnetic loop parts extending in parallel between the free end of the voltage pole and the free ends of the outer legs through a portion of the armature device, a magnetic path unit including a soft magnetic member extending transversely relative to the plane of the voltage section from said voltage pole adjacent the air gap, and magnetic means completing with the magnetic member a separate magnetic path in shunt with the air gap for magnetic flux produced by the voltage winding means, and a closed electroconductive unit linked with the magnetic path, said magnetic path and said closed electroconductive unit having screw-threaded parts operable for adjusting the loading of the voltage winding means by the closed electroconductive unit, said magnetic path having a portion exhibiting a substantial negative temperature coefficient of permeability for Class II temperature compensation, said magnetic means extending symmetrically from a position adjacent the magnetic member to the free ends of the outer legs to define with the magnetic member said magnetic path which is clear of the armature device, said magnetic means directing magnetic flux between the voltage pole and each of the outer legs through the magnetic member.

5. In an induction device responsive to a function of the volt-amperes in an alternating current circuit, an electromagnet unit comprising an E-shaped planar soft magnetic voltage section having a central voltage pole and two outer legs, a soft magnetic current section having current poles spaced from the voltage pole to define an air gap therebetween, voltage winding means effective when energized in accordance with an alternating voltage for directing first alternating magnetic flux through the voltage pole into the air gap, current winding means effective when energized at least in part by alternating current for directing second alternating magnetic flux through the current poles into the air gap to establish with the first magnetic flux a shifting resultant magnetic field in the air gap, an electroconductive armature device mounted for rotation relative to the electromagnet unit about an axis, said armature having a portion positioned in the air gap to develop a torque from said resultant magnetic field which acts to rotate the armature device relative to the electromagnet unit about said axis, a magnetic path unit including a soft magnetic member extending transversely relative to the plane of the voltage section from said voltage pole adjacent the air gap, and magnetic means completing with the magnetic member a magnetic path for magnetic flux produced by the voltage winding means, and a tubular electroconductive unit substantially surrounding a portion of said magnetic member to be linked substantially by magnetic flux flowing in said magnetic path, said magnetic means comprising a magnetic element having a part extending from a position adjacent the magnetic member to each of said outer legs.

6. In an induction device responsive to a function of the volt-amperes in an alternating current circuit, an electromagnet unit comprising an E-shaped planar soft magnetic voltage section having a central voltage pole and two outer legs, a soft magnetic current section having current poles spaced from the voltage pole to define an air gap therebetween, voltage winding means effective when energized in accordance with an alternating voltage for directing first alternating magnetic flux through the voltage pole into the air gap, current winding means effective when energized at least in part by alternating current for directing second alternating magnetic flux through the current poles into the air gap to establish with the first magnetic flux a shifting resultant magnetic field in the air gap, an electroconductive armature device mounted for rotation relative to the electromagnet unit about an axis, said armature having a portion positioned in the air gap to develop a torque from said resultant magnetic field which acts to rotate the armature device relative to electromagnet unit about said axis, a magnetic path unit including a soft magnetic member extending transversely relative to the plane of the voltage section from said voltage pole adjacent the air gap, and magnetic means completing with the magnetic member a magnetic path for magnetic flux produced by the voltage winding means, a tubular electroconductive unit substantially surrounding a portion of said magnetic member to be linked substantially by magnetic flux flowing in said magnetic path, said magnetic means comprising a magnetic element having a part extending from a position adjacent the magnetic member to each of said outer legs, and a sleeve of soft magnetic material having a substantial negative temperature coefficient of permeability concentric with said tubular electroconductive unit, said sleeve surrounding a portion of the magnetic member and being within the electroconductive unit.

7. In an induction device responsive to a function of the volt-amperes in an alternating current circuit, an electromagnet unit comprising an E-shaped planar soft magnetic voltage section having a central voltage pole and two outer legs, a soft magnetic current section having current poles spaced from the voltage pole to define an air gap therebetween, voltage winding means effective when energized in accordance with an alternating voltage for directing first alternating magnetic flux through the voltage pole into the air gap, current winding means effective when energized at least in part by alternating current for directing second alternating magnetic flux through the current poles into the air gap to establish with the first magnetic flux a shifting resultant magnetic field in the air gap, an electroconductive armature device mounted for rotation relative to the electromagnet unit about an axis, said armature having a portion positioned in the air gap to develop a torque from said resultant magnetic field which acts to rotate the armature device relative to electromagnetic unit about said axis, a magnetic path unit including a soft magnetic screw extending transversely relative to the plane of the voltage section from said voltage pole adjacent the air gap, and magnetic means completing with the magnetic screw a magnetic path for magnetic flux produced by the voltage winding means, and a tubular electroconductive unit substantially surrounding a portion of said magnetic screw to be linked substantially by magnetic flux flowing in said magnetic path, said magnetic means comprising a magnetic element in threaded engagement with the screw and extending substantially from the screw to each of said outer legs, said electroconductive unit being positioned between the magnetic element and the central voltage pole.

8. In an induction device responsive to a function of the volt-amperes in an alternating current circuit, an electromagnet unit comprising an E-shaped planar soft magnetic voltage section having a central voltage pole and two outer legs, a soft magnetic current section having current poles spaced from the voltage pole to define an air gap therebetween, voltage winding means effective when energized in accordance with an alternating voltage for directing first alternating magnetic flux through the voltage pole into the air gap, current winding means effective when energized at least in part by alternating current for directing second alternating magnetic flux through the current poles into the air gap to establish with the first magnetic flux a shifting resultant magnetic field in the air gap, an electroconductive armature device mounted for rotation relative to the electromagnet unit about an axis, said armature having a portion positioned in the air gap to develop a torque from said resultant magnetic field which acts to rotate the armature device relative to electromagnet unit about said axis, a magnetic path unit including a soft magnetic screw extending transversely relative to the plane of the voltage section from said voltage pole adjacent the air gap, and magnetic means completing with the magnetic screw a magnetic path for magnetic flux produced by the voltage winding means, a tubular electroconductive unit substantially surrounding a portion of said magnetic screw to be linked substantially by magnetic flux flowing in said magnetic path, said magnetic means comprising a magnetic element in threaded engagement with the screw and extending substantially from the screw and to each of said outer legs, said electroconductive unit being positioned between the magnetic element and the central voltage pole, and a frictional member secured to the electroconductive unit in threaded engagement with the screw.

9. In an induction device responsive to a function of the volt-amperes in an alternating current circuit, an electromagnet unit comprising an E-shaped planar soft magnetic voltage section having a central voltage pole and two outer legs, a soft magnetic current section having current poles spaced from the voltage pole to define an air gap therebetween, voltage winding means effective when energized in accordance with an alternating voltage for directing first alternating magnetic flux through the voltage pole into the air gap, current winding means effective when energized at least in part by alternating current for directing second alternating magnetic flux through the current poles into the air gap to establish with the first magnetic flux a shifting resultant magnetic field in the air gap, an electroconductive armature device mounted for rotation relative to the electromagnet unit about an axis, said armature having a portion positioned in the air gap to develop a torque from said resultant magnetic field which acts to rotate the armature device relative to electromagnet unit about said axis, a magnetic path unit including a soft magnetic screw extending transversely relative to the plane of the voltage section from said voltage pole adjacent the air gap, and magnetic means completing with the magnetic screw a magnetic path for magnetic flux produced by the voltage winding means, a tubular electroconductive unit substantially surrounding a portion of said magnetic screw to be linked substantially by magnetic flux flowing in said magnetic path, said magnetic means comprising a magnetic element in threaded engagement with the screw and extending substantially from the screw to each of said outer legs, said electroconductive unit being positioned between the magnetic element and the central voltage pole, a frictional member secured to the electroconductive unit in threaded engagement with the screw, and a soft-magnetic sleeve surrounding a portion of the screw and located between the frictional member and the voltage pole, said sleeve having a substantial negative temperature coefficient of magnetic permeability.

10. In an induction device responsive to a function of the volt-amperes in an alternating current circuit, an electromagnet unit comprising an E-shaped planar soft magnetic voltage section having a central voltage pole and two outer legs, a soft magnetic current section having current poles spaced from the voltage pole to define an air gap therebetween, voltage winding means effective when energized in accordance with an alternating voltage for directing first alternating magnetic flux through the voltage pole into the air gap, current winding means effective when energized at least in part by alternating current for directing second alternating magnetic flux through the current poles into the air gap to establish with the first magnetic flux a shifting resultant magnetic field in the air gap, an electroconductive armature device mounted for rotation relative to the electromagnet unit about an axis, said armature having a portion positioned in the air gap to develop a torque from said resultant magnetic field which acts to rotate the armature device relative to electromagnet unit about said axis, a magnetic path unit including a soft magnetic member extending transversely relative to the plane of the voltage section from said voltage pole adjacent the air gap, and magnetic means completing with the magnetic member a magnetic path for magnetic flux produced by the voltage winding means, and a closed electroconductive unit linked with the magnetic path, said electroconductive unit comprising a screw-threaded tubular member in threaded engagement with the magnetic path unit for adjustment to vary the amount of the tubular member linked with magnetic flux flowing in the magnetic path.

11. In an induction device responsive to a function of the volt-amperes in an alternating current circuit, an electromagnetic unit comprising a magnetic structure having an air gap, voltage winding means effective when energized in accordance with an alternating voltage for establishing an alternating first magnetic field in the air gap, current winding means effective when energized at least in part in accordance with an alternating current for establishing an alternating second magnetic field in the air gap which cooperates with the first magnetic field to establish a shifting resultant magnetic field in the air gap, said current winding means having a configuration serving to lag the first magnetic field, an electroconductive armature device mounted for rotation about an axis relative to the magnetic structure, said armature device having a portion positioned in the air gap to develop a torque for said resultant magnetic field which acts to rotate the armature device relative to the magnetic structure about said axis, and phase-control mechanism for adjusting the phase relation between the first and second magnetic fields, said phase-control mechanism including a plurality of concentric elements, said concentric elements comprising a soft magnetic cylindrical inner element, means cooperating with the inner element to establish a magnetic path for directing magnetic flux produced by current flowing in the voltage winding means axially through the inner element and away from the air gap, said concentric elements including a tubular electroconductive outer element substantially surrounding the inner element and constituting an inductively-coupled load for the voltage winding means, and screw-thread means including screw threads on one of the concentric elements operable for moving one of the concentric elements along its axis to vary the loading of the voltage winding means by the outer element.

References Cited by the Examiner

UNITED STATES PATENTS

| | | | |
|---|---|---|---|
| 1,566,902 | 12/25 | Ciffrinowitsch | 324—137 |
| 2,160,416 | 5/39 | Green | 324—137 |
| 2,363,284 | 11/44 | Barnes | 324—138 |
| 2,626,297 | 1/53 | Leippe | 324—137 |
| 2,849,680 | 8/58 | Lenehan | 324—138 |
| 2,900,604 | 8/59 | Schmidt | 324—138 |

WALTER L. CARLSON, *Primary Examiner.*